J. THRASHER.
Wagon-Wheel.
No 52,341. Patented Jan. 30, 1866.
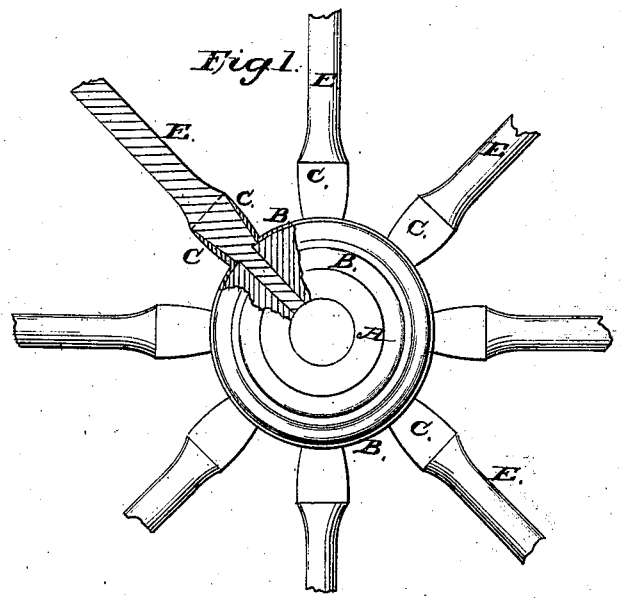
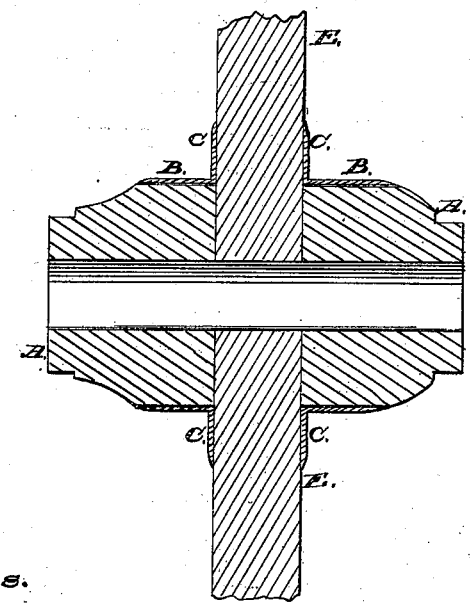

UNITED STATES PATENT OFFICE.

JOHN THRASHER, OF WEST LIBERTY, OHIO.

IMPROVEMENT IN WAGON-WHEELS.

Specification forming part of Letters Patent No. 52,341, dated January 30, 1866.

*To all whom it may concern:*

Be it known that I, JOHN THRASHER, of West Liberty, in the county of Logan and State of Ohio, have invented a new and useful Improvement in Wagon-Wheels; and I do hereby declare that the following is a full, clear, and exact description thereof, which will enable those skilled in the art to make and use the same, reference being had to the accompanying drawings, forming part of this specification, in which—

Figure 1 is a side view of a portion of a wagon-wheel, partly in section, illustrating my invention. Fig. 2 is a longitudinal section through the line $x\ x$, Fig. 1.

Similar letters of reference indicate corresponding parts.

The object of my invention is to strengthen the hub, and thereby enable it to be made lighter than it could otherwise be made with safety, and also to strengthen the spokes at their weak point—that is, where they meet the outer surface of the hub; and it consists in combining with the hub and with the spokes of a wagon-wheel a metallic band provided with sockets for the reception of the spokes, said sockets being cast solid with said band.

A is the wooden part of the hub, made in the usual form and manner, except that it may be made much lighter than when used without my improvement.

B is the band which is passed around the hub, and should be as much wider than the spokes E are broad as will give sufficient metal between the spokes and the edge of the band to furnish the requisite strength. The bands B are cast of malleable iron, and are cast with as many projecting sockets C as it is designed there should be spokes to the wheel. These sockets are made larger than the mortises in the hub which receive the spoke-tenons and large enough to receive the shoulders of the spokes above the tenon. The sides of the sockets are also made slightly tapering, as shown in Fig. 1. The height of the sockets is immaterial. They should be high enough to afford sufficient strength to the spokes, and not so high as to interfere with the neat appearance of the wheel.

By this improvement the hub may be made light, the necessary strength being attained, and at the same time the hub prevented from cracking or splitting by the band.

By this improvement the spokes are also strengthened at their weak point and prevented from breaking off at the surface of the hub.

I claim as new and desire to secure by Letters Patent—

The hub-band B, pivoted with sockets C, to fit the large part of the spokes, while the mortises in the hub receive the spoke-tenons, all substantially as herein described.

JOHN THRASHER.

Witnesses:
EDWARD THRASHER,
R. N. JORDAN.